US009596574B1

(12) United States Patent
Groenjes

(10) Patent No.: US 9,596,574 B1
(45) Date of Patent: *Mar. 14, 2017

(54) CONTROLLING A CROWD OF MULTIPLE MOBILE STATION DEVICES

(71) Applicant: West Corporation, Omaha, NE (US)

(72) Inventor: Jason H. Groenjes, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,554

(22) Filed: Jul. 22, 2015

Related U.S. Application Data

(63) Continuation of application No. 13/482,555, filed on May 29, 2012, now Pat. No. 9,094,489.

(51) Int. Cl.
*H04W 24/00* (2009.01)
*H04W 4/04* (2009.01)

(52) U.S. Cl.
CPC .................................... *H04W 4/04* (2013.01)

(58) Field of Classification Search
CPC .. H04W 12/06; H04W 8/183; H04L 63/0853; H04L 12/14; H04B 1/3816; H04M 1/72522; H04M 1/72561
USPC ........ 455/411, 558, 414.1, 415, 552.1, 432.1
See application file for complete search history.

(56) References Cited

U.S. PATENT DOCUMENTS

| 5,991,406 | A  | * | 11/1999 | Lipner   | H04L 9/3271 380/286    |
|-----------|----|---|---------|----------|------------------------|
| 8,077,628 | B2 | * | 12/2011 | Giles    | H04M 1/72572 370/252   |
| 8,260,354 | B2 | * | 9/2012  | Park     | H04B 1/3816 235/380    |
| 8,269,876 | B2 | * | 9/2012  | Naruto   | G06F 3/04845 348/333.02|
| 9,100,810 | B2 | * | 8/2015  | Schell   | H04W 8/205 455/411     |
| 2002/0082036 | A1 | * | 6/2002 | Ida    | H04W 52/283 455/522    |
| 2007/0254646 | A1 | * | 11/2007 | Sokondar | H04W 8/183 455/432.1 |
| 2008/0319253 | A1 | * | 12/2008 | Ishiwata | A61M 21/02 600/28    |
| 2009/0153694 | A1 | * | 6/2009 | Takayama | G06T 3/4053 348/222.1 |
| 2009/0191846 | A1 | * | 7/2009 | Shi    | G06F 21/32 455/411     |

(Continued)

*Primary Examiner* — Joseph Arevalo
(74) *Attorney, Agent, or Firm* — Raffi Gostanian

(57) ABSTRACT

A method and apparatus of communicating with multiple mobile station devices in a concerted effort is disclosed. According to one example method of operation content is provided to multiple mobile station devices in a pre-defined venue location. The method may also provide identifying the mobile station devices as being present at the pre-defined venue location via a server and initiating an application on the server that establishes a customized content delivery function utilized to deliver customized content to each of the identified mobile station devices. A command may be triggered to begin transmitting the customized content to each of the mobile station devices at a predetermined time and the customized content may be transmitted to each of the mobile station devices responsive to receiving the trigger command.

20 Claims, 11 Drawing Sheets

(56) References Cited

U.S. PATENT DOCUMENTS

| | | | |
|---|---|---|---|
| 2009/0207278 A1* | 8/2009 | Muraki | H04N 5/235 348/231.99 |
| 2009/0221273 A1* | 9/2009 | de Leon | G10H 1/0083 455/414.1 |
| 2009/0259967 A1* | 10/2009 | Davidson | G06F 3/0481 715/799 |
| 2009/0291712 A1* | 11/2009 | Park | H04B 1/3816 455/558 |
| 2010/0197281 A1* | 8/2010 | Bennett | H04L 12/14 455/414.1 |
| 2011/0010543 A1* | 1/2011 | Schmidt | H04W 12/10 713/168 |
| 2011/0028135 A1* | 2/2011 | Srinivasan | H04M 3/42382 455/415 |
| 2012/0081207 A1* | 4/2012 | Toprani | G06F 9/445 340/4.3 |
| 2012/0108206 A1* | 5/2012 | Haggerty | H04W 12/06 455/411 |
| 2012/0108207 A1* | 5/2012 | Schell | H04L 63/0853 455/411 |
| 2012/0108295 A1* | 5/2012 | Schell | H04W 4/001 455/558 |

* cited by examiner

CONTROLLING A CROWD OF MULTIPLE MOBILE STATION DEVICES

CROSS-REFERENCE TO RELATED APPLICATIONS

This application is a continuation from U.S. patent application Ser. No. 13/482,555, filed May 29, 2012, entitled "CONTROLLING A CROWD OF MULTIPLE MOBILE STATION DEVICES", which is incorporated by reference herein in its entirety.

TECHNICAL FIELD OF THE INVENTION

This invention relates to the control of multiple mobile stations devices that are located in a crowd and more particularly to communicating with mobile station users via their mobile station devices during a live event.

BACKGROUND OF THE INVENTION

Conventionally, live events such as football games, concerts, lectures, etc., have always sought to capture the attention of the audience. An audience full of potential consumers experiencing a moment of excitement and connection to the live event or on-stage performer will likely purchase souvenir items, concessions items, presenter materials (e.g., books, CD's, DVD's, etc.) or any other services or products that attract their interest.

In one example, audience members of a live music concert often times purchase t-shirts, compact discs (CDs) and other recommended items from the performer(s). Essentially, performers seek to draw a crowd not just for ticket purchase prices but to connect with them in a way that assists the future sale of records or other items that generate profits.

The live event industry is always seeking new ways to establish a stronger bond and personal connection with individuals through a unique and personalized experience. Currently, the majority of attendees carry mobile devices (i.e., smartphones, cell phones, tablet computing devices, etc.) to the live event and are likely to interface with their mobile devices before, during and after the event. By taking active measures to engage the audience members through their mobile devices as well as through live on-stage activity, the purchasing habits of those attendees may increase significantly.

SUMMARY OF THE INVENTION

One embodiment of the present invention may include a method of providing content to a plurality of mobile station devices in a pre-defined venue location. The method may include identifying the plurality of mobile station devices as being present at the pre-defined venue location via a server and initiating an application on the server that establishes a customized content delivery function utilized to deliver customized content to each of the identified plurality of mobile station devices. The method may also include receiving a trigger command to transmit the customized content to each of the plurality of mobile station devices at a predetermined time and transmitting the customized content to each of the plurality of mobile station devices responsive to receiving the trigger command.

According to another example embodiment an apparatus may be configured to provide content to a plurality of mobile station devices in a pre-defined venue location. The apparatus may include a processor configured to identify the plurality of mobile station devices as being present at the pre-defined venue location and initiate an application on the server that establishes a customized content delivery function utilized to deliver customized content to each of the identified plurality of mobile station devices. The apparatus may also include a receiver configured to receive a trigger command to transmit the customized content to each of the plurality of mobile station devices at a predetermined time, and a transmitter configured to transmit the customized content to each of the plurality of mobile station devices responsive to receiving the trigger command.

DETAILED DESCRIPTION OF THE INVENTION

Figure 1A:
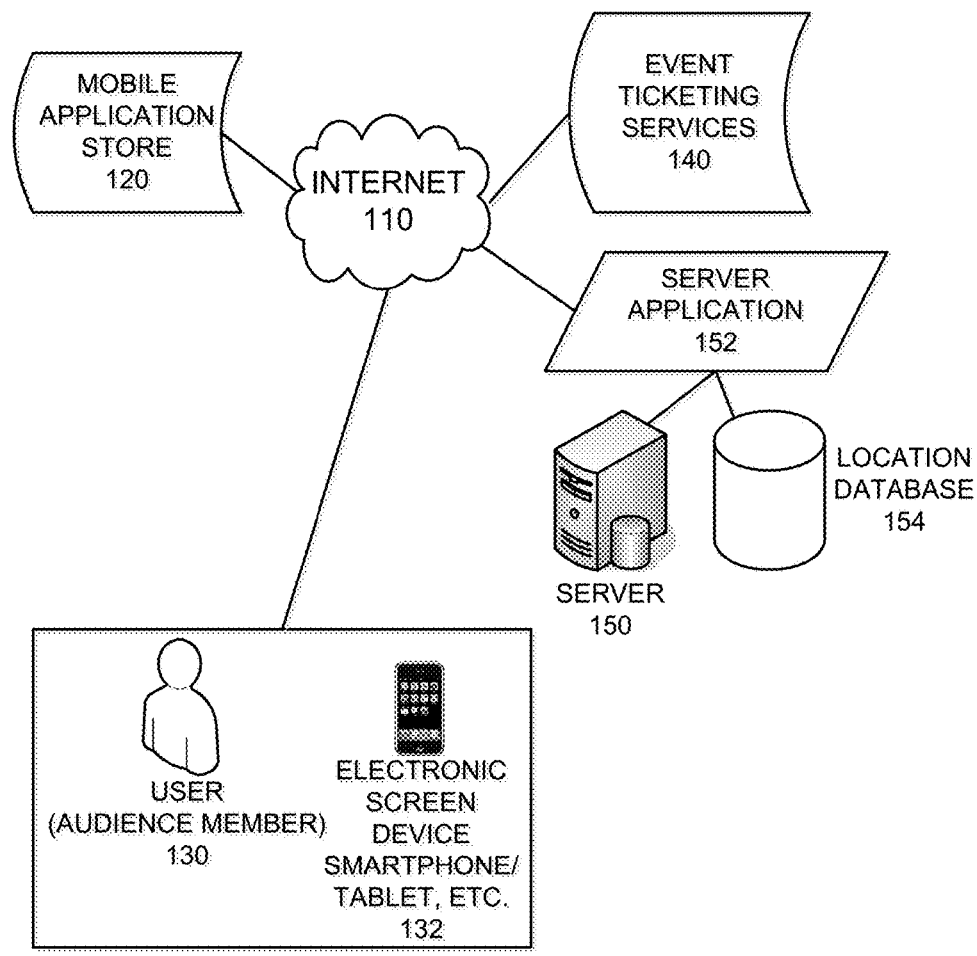
FIG. 1A illustrates an example logic communication diagram of mobile station interaction during a live event, according to example embodiments.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments provide a device, system, method and/or computer program configured to provide a set of procedures/protocols used to create an interactive experience for members of a crowd through the use of their personal electronic devices (i.e. mobile devices). The electronic device is typically a cell phone or tablet or other mobile electronic device that include wireless radio communications capabilities, such as WIFI, and/or any other data radio services, such as $3^{rd}/4^{th}$ generation communications (i.e., 3G, 4G, long-term evolution (LTE) technologies used by commercial mobile radio service (CMRS) carriers).

The communication service may be offered via various different application functions installed as a mobile application on the user's mobile station. The mobile station device may be a computer, laptop, mobile, wireless or cellular phone, a PDA, a table, a client a server or any device that contains a processor and/or memory, whether that processor or memory performs a function related to an embodiment of the invention. According to the example embodiments, there are five major modes of operation available, such as many-to-many, one-to-many, many-to-one, one-to-one, and a server-less interactive mode. Examples of one or more of these types of interactions are described below.

According to a first mode of operation a one-to-one mode type of operation may provide the mobile station application being used by a consumer to select a purchase of some service or product. For example, the audience members of a live performance may be desiring to purchase items that are based on whatever the audience is attending or watching. In turn, this type of situation permits the live performance to increase the user's buying habits while at the same time, providing them with a unique service with personalized content stored on their mobile device enabled by the application.

Example embodiments may provide a unique, interactive experience for individuals in a crowd setting via an application on their mobile stations. The application has multiple uses when used both individually and/or within live crowd settings of other mobile stations. The mobile stations may have a user interface screen and a WIFI or other 3G/4G/LTE wireless radio mobile connection to an application server, base station or wireless access point, which is able to identify and track the device's location within a given perimeter, such as a building or arena via a location based technology (i.e., local power estimation, triangulation, GPS, coordinate registration, etc.). By maintaining a database of 2D and/or 3D coordinate axis locations of the device, the application server is able to use the wireless connection to change the screen appearance and/or color on the mobile station device. In this manner, each device screen is used much the same as a single pixel or multiple pixels of light would be used in an LCD monitor.

FIG. 1A illustrates an example logic communication diagram 100 of mobile station interaction during a live event, according to example embodiments. Referring to FIG. 1A, a user or future member of the audience 130 may be in operation of his or her mobile station device 132. In operation, a pre-event procedure may include a user 130 registering for an event with a manual entry of a particular seat location and event date. The user will purchase a ticket to the upcoming event through any on-line ticket sales outlet via a computer, phone or via the mobile station 132. The user may be optionally directed to the mobile application store 120 to download the mobile device application software. Once selected by the user, the exact seat location information for the purchased event tickets are then transmitted from the ticketing agent 140 to the server 150 and corresponding application 152, which logs the user's information, including mobile station identifier, user name, seat location, event date, etc., in a location database 154. The setup procedure may be performed autonomously with little or no user interaction, or upon the user agreeing to attend an event without requiring any additional information from the user.

Figure 1B:
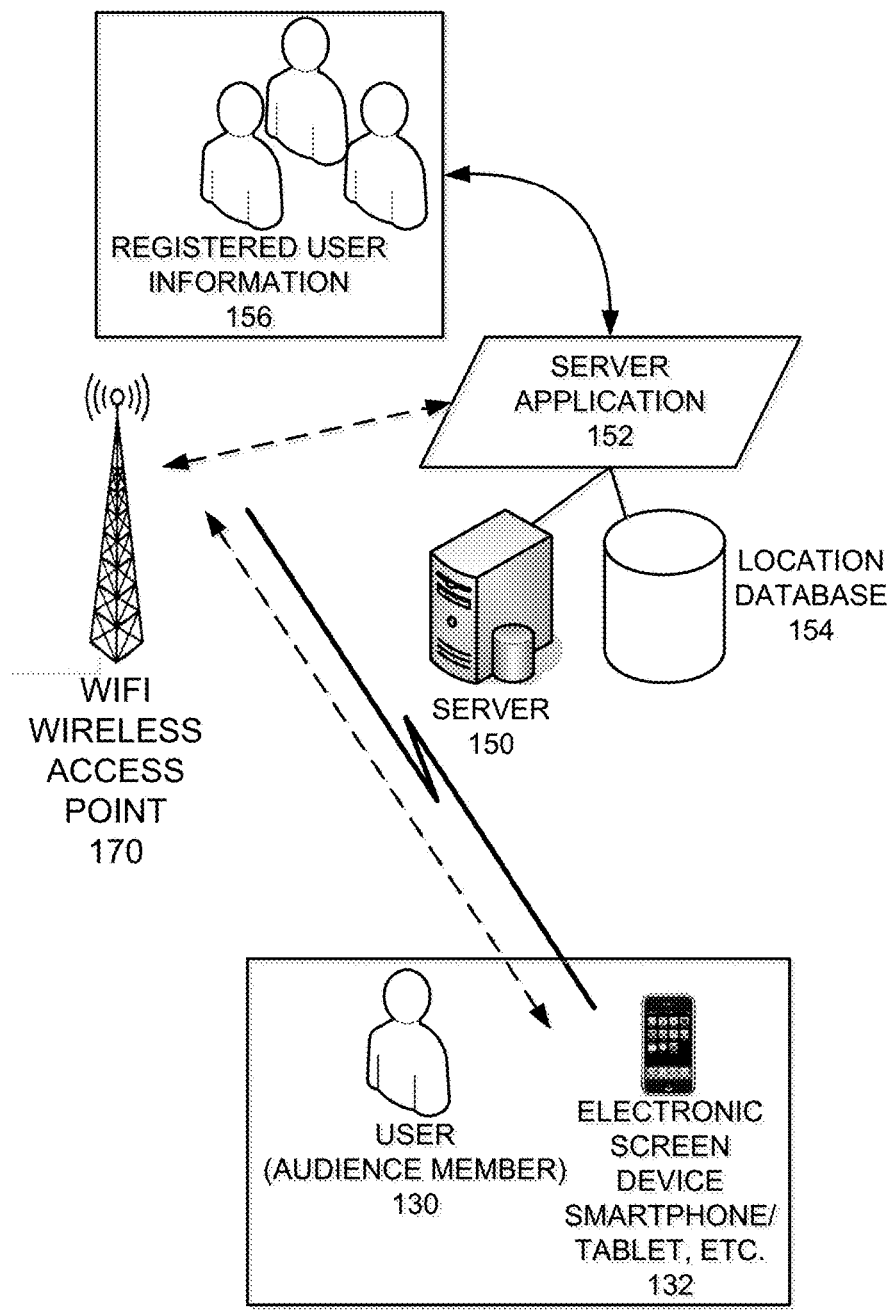
FIG. 1B illustrates a detailed communication diagram of mobile station interaction during a live event, according to example embodiments.

FIG. 1B illustrates a detailed communication diagram of mobile station interaction during a live event 160, according to example embodiments. Referring to FIG. 1B, once the event date has matured and the user is present at the event, the mobile application may be launched automatically based on a known location or time frame of the mobile station. The mobile application may enact the mobile station 132 to connect to the local WIFI access point 170 and corresponding communication service in the venue and automatically register to the application server 150. The server application 152 validates each registered devices' seat location based on pre-stored registered user information 156 and/or location information stored in database 154, which allows for the user to manually enter or select their specific location from a seating chart displayed on the screen of their device. The user's location may be already known or may be determined based on a location determination algorithm.

The server application 152 ensures each registered device has an assigned location in the arena and also ensures there are no duplicates. Additional validation of a location could be accomplished through triangulation on the WIFI network and/or GPS location information sensed from each device. The location information could be used to assign unknown locations for mobile station devices, or to determine how to deal with duplicate location situations (i.e., two customers identified as having the same seat assignment).

Figure 2A:
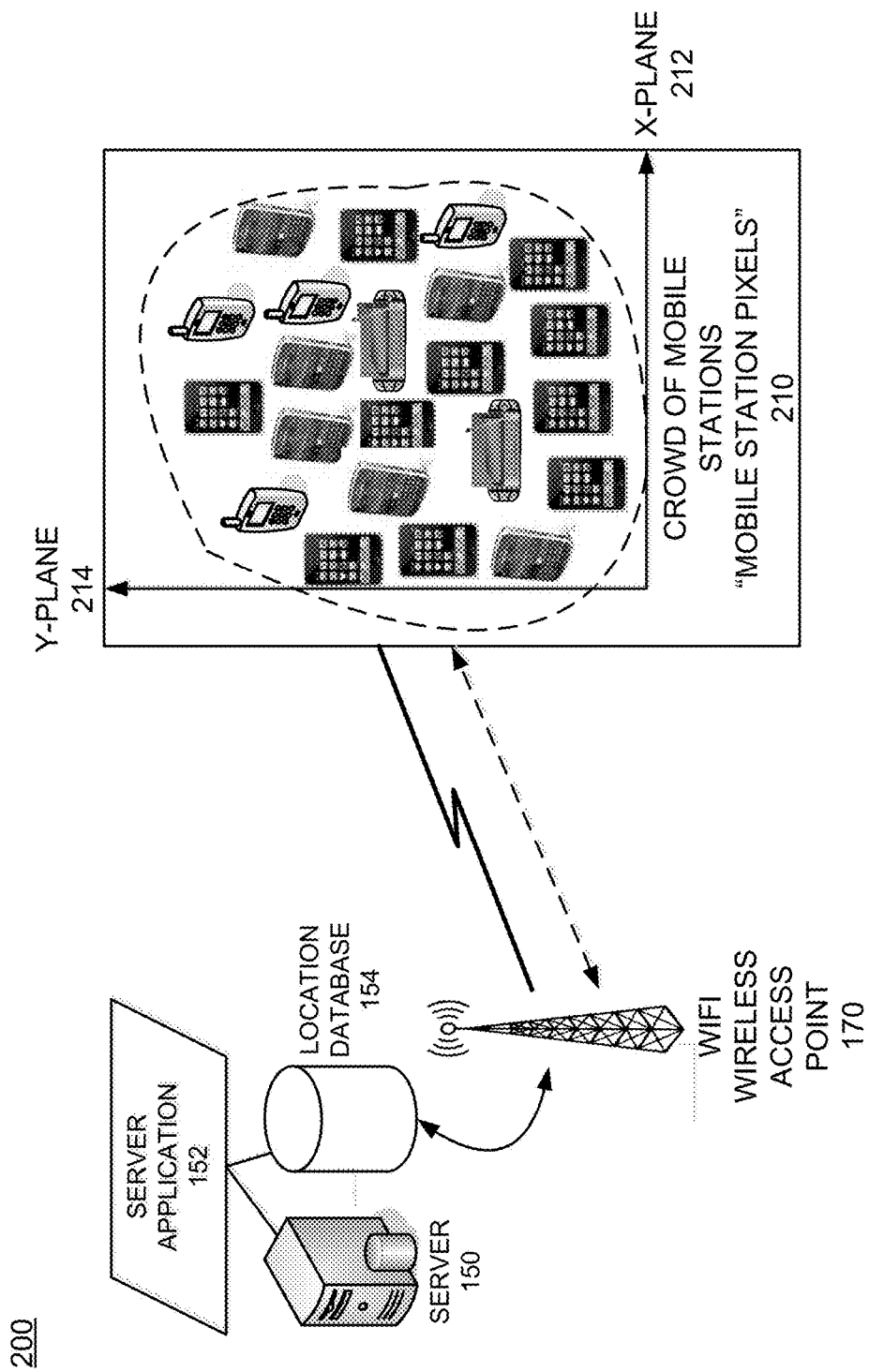
FIG. 2A illustrates an example crowd control example of providing content to mobile station users during a live event.

FIG. 2A illustrates an example crowd control example 200 of providing content to mobile station users during a live event. Referring to FIG. 2A, a crowd of many mobile station users 210 are illustrated as being congregated in a common venue location. The server application 152 may possess the capability to turn the screens of each of the mobile stations into points of light that are centrally controllable through a single application. In large groups or crowd-like environments, such as a full arena at a concert, the individual points of light generated by the mobile station are relatively close together and their locations within the confines of the arena may be identified by the seat/section number that the various mobile stations are located.

The X-Y plane 212/214 used to define the points of light (hereinafter referred to as "mobile station pixels"), may have a basic structure that mimics the common everyday flat panel monitor display. Depending on the color and intensity of each point of light generated by the mobile station pixels, an unlimited set of images and moving images can be displayed. The crowd display will result in the crowd participants' mobile station display being illuminated based on a remote command(s) from the WIFI wireless access point 170. The various mobile station pixels will provide the application with the capability to create images, moving images, interactive games, etc. and other lighting effects across the multi-human/multi-mobile station screen. A user must bring his or her mobile station device in order to participate, however, now-a-days, most every concert participant has a smartphone or similar device.

Figure 2B:
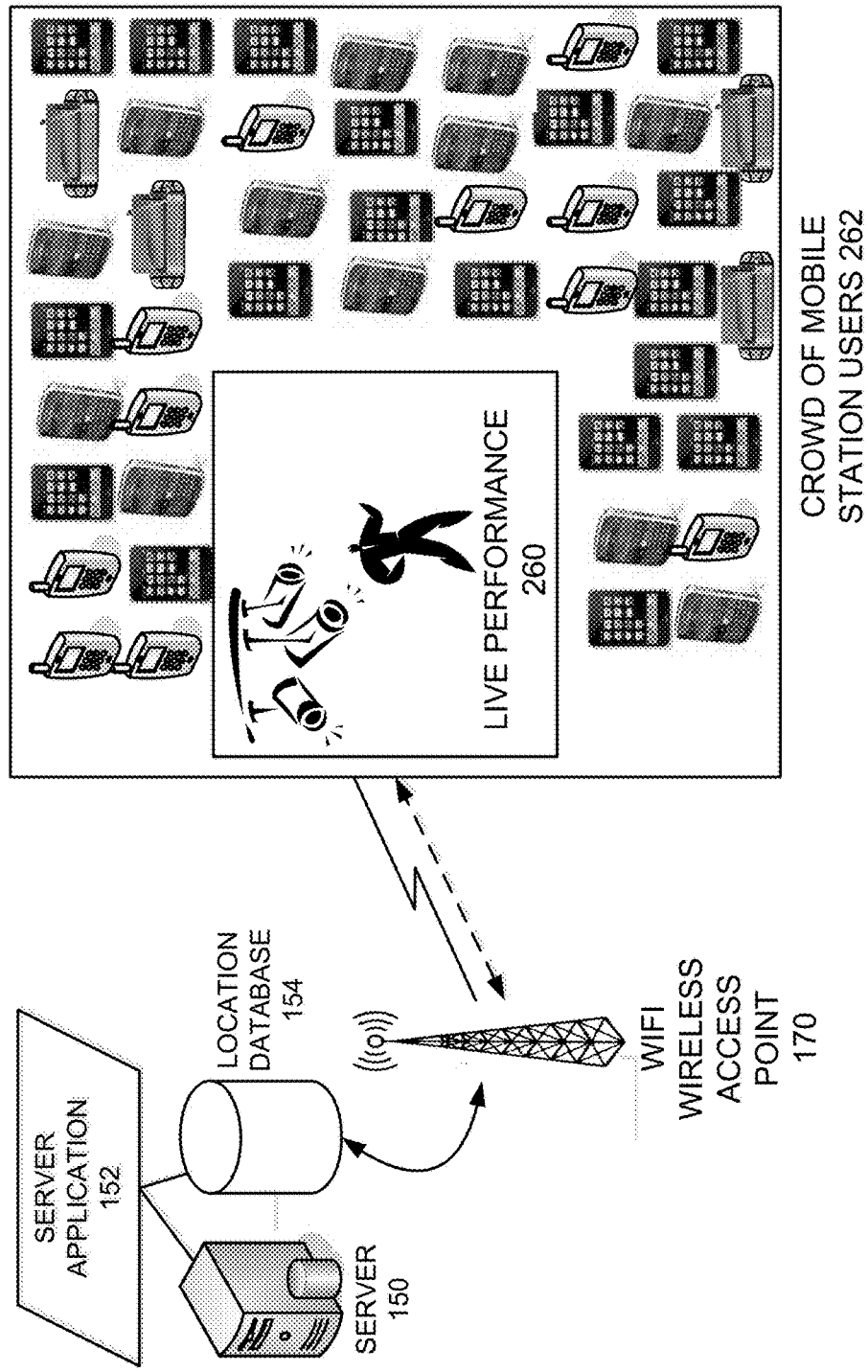
FIG. 2B illustrates another example crowd control example of providing content to mobile station users during a live event.

FIG. 2B illustrates another example crowd control example 250 of providing content to mobile station users during a live event. According to another example of operation, a performer on stage during a live performance 260, an automated application installed on the user mobile stations 262 will access the server 150 and to receive content and display full-color lighting effects on the screens of each mobile device in the audience. Just as any digital monitor is a collection of points of light in a 2D grid (i.e., pixels), each mobile station in the audience that is registered with the server application 152 will be treated as a wide-scale 2D grid display. However, most audience seating configurations may include varying elevations (i.e., premier seating, middle concourse, upper-deck concourse, etc.), this may allow the display application to also invoke three dimensional 3D effects.

According to one example, a strobe of white light may be flashed onto the stage from the concert lighting, thereafter a flash of white light may be transmitted as a data message from the WIFI access point 170 onto the screens of every mobile station registered with that application in the audience. Next a blue flash, next a red flash, then a musical band name and/or logo etc. In another example, a wave of green light may emerge on each user's mobile station just long enough to create a rolling "wave" effect that travels across the stage and on around the arena at a full 360 degrees on the screens of the mobile station and on any large displays reflecting the live content of the audience. The types of lighting effects that be displayed on these mobile pixel points in the audience are infinite and may be any type of image that could normally be displayed on a digital monitor.

The individual screens of each audience members' devices make up a large digital monitor with each device being treated as a single pixel of light. The server application 152 registered with each mobile station 262 may act as a large video driver to determine which pixel (device) displays what color and at what time. In practice, the crowd displays may be images that have been mapped onto various devices according to their respective locations via a mapping table that includes, mobile station identifier, mobile station location, image color at a particular pixel, image intensity, image duration, etc.

Figure 2C:
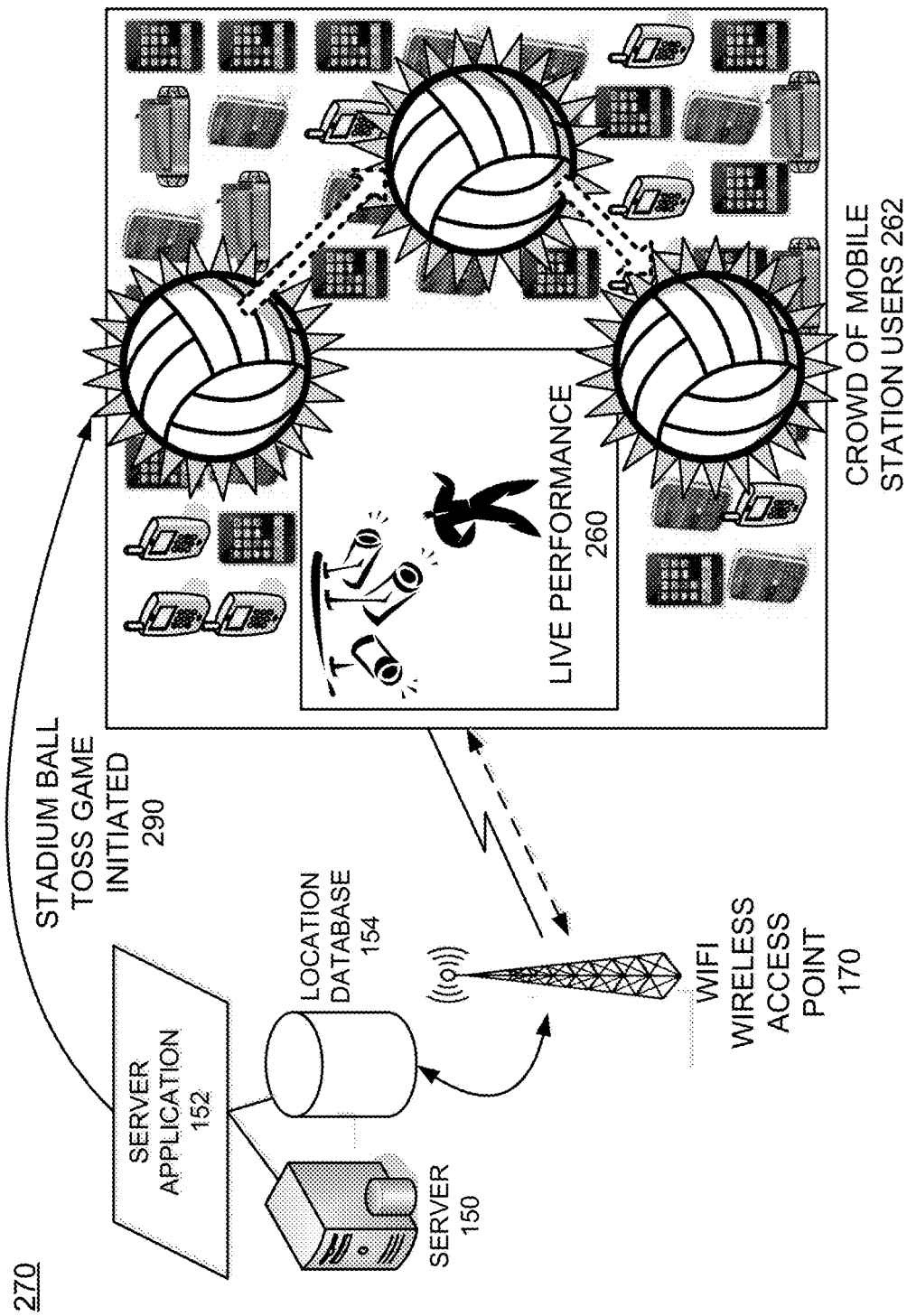
FIG. 2C illustrates still another example crowd control example of providing content to mobile station users during a live event.

FIG. 2C illustrates still another example crowd control example 270 of providing content to mobile station users during a live event. Referring to FIG. 2C, like identifiers refer to like elements with respect to other drawings. The mobile stations 262 are registered with the server application 152. In this example, the mobile stations are all situated in a standard arena-style seating configuration and could play video games with each other. For example, the legendary game of "Pong" may be played as a basic video game where a ball on the screens bounce back and forth between two paddles. The paddles may be controlled by opposing teams and the object is to bounce the ball off your paddle and back to the other player. In a standard concert arena seating configuration, audience members are seated in a "U" shape.

The paddles of the game would be generated at each end of the "U" on points of light on the screens of mobile stations located at those seats.

The ball would bounce around between the paddles around the "U" shaped audience wide-scale monitor as each audience member would be holding up their mobile station which was registered to the application. Paddles would be controlled to move up or down by tracking the tilt sensors of the designated mobile stations at predefined locations (i.e., accelerometers in the mobile stations of a selected number of audience members who's mobile devices would control the movement of the paddles).

In a simpler example, the performer may initiate the kicking of a large beach ball as illustrated in FIG. 2C. The virtual ball would roll across the monitors of each of the users' mobile stations in a circular wave motion that traverses the U-shaped seating venue. The virtual ball would be initiated via an operation 290 by a game stored in the server application 152. The ball would track the positions of the registered and online mobile stations and perform a rolling motion once initiated to include all participating mobile stations.

According to another example, crowd events may include camera shots on the big screens near the front stage that are candid shots of certain member(s) of the audience. Today, this practice is limited to camera operators seated around the arena who must find interesting shots and then display them on the large monitors in the arena. According to an example embodiment, the users are capable of using the video capabilities of their mobile stations to shoot snippets of video in their particular seating section submit them to a reviewer tied to the application who would review the video for appropriate content and queue those snippets to be displayed on the large arena monitors. This embodiment enhances the audience member's participation in the event as they have a personal connection to the video that was shown to the entire audience.

Additional examples may include words or images that could be created and scrolled across the human wide-scale screen. For example, games could be played, such as "Pong" that has paddles controlled by accelerometer movement of the section of audience. Electric beach ball, which may include accelerometer movement used to bounce a colorful beach ball through the audience. The ball could start on stage and be "batted" away on its first path across the virtual audience screen (See FIG. 2C).

Other examples may include generic crowd gatherings to include any event where video replays on each person's individual screen that allows each user to select which video replay angle they want to view. The video replays are on-demand and therefore may not be viewable only when the screen(s) in the arena provide the playback. Other examples include raffles or any other type of random audience member selected for some specific purpose including live audio. For example, the stage person(s) microphone may be connected to the speakers in every device. The user may be able to store what they are hearing automatically via the local and secure wireless connection to the server. The users may also be allowed to participate in surveys or trivia to keep the crowd calm in the beginning of the concert or during an intermission. Also, live voting may be used to see what the crowd really wants to see or hear (i.e., a question may be transmitted to the audience members on their mobile stations "what song are you anticipating most before the concert is over, A, B or C . . . ?"). Yet another example may include a short message service (SMS) interactive menu where the audience may submit a question to the speaker to see so the more popular questions may be answered. Also products or services relating to the event at which the application is being used could be displayed on the user's device ("pre-order your concert t-shirt now and it will be sent to your house, avoid the lines!"). The user could accept messages and alerts at a later time for marketing of other products or services.

Figure 3:
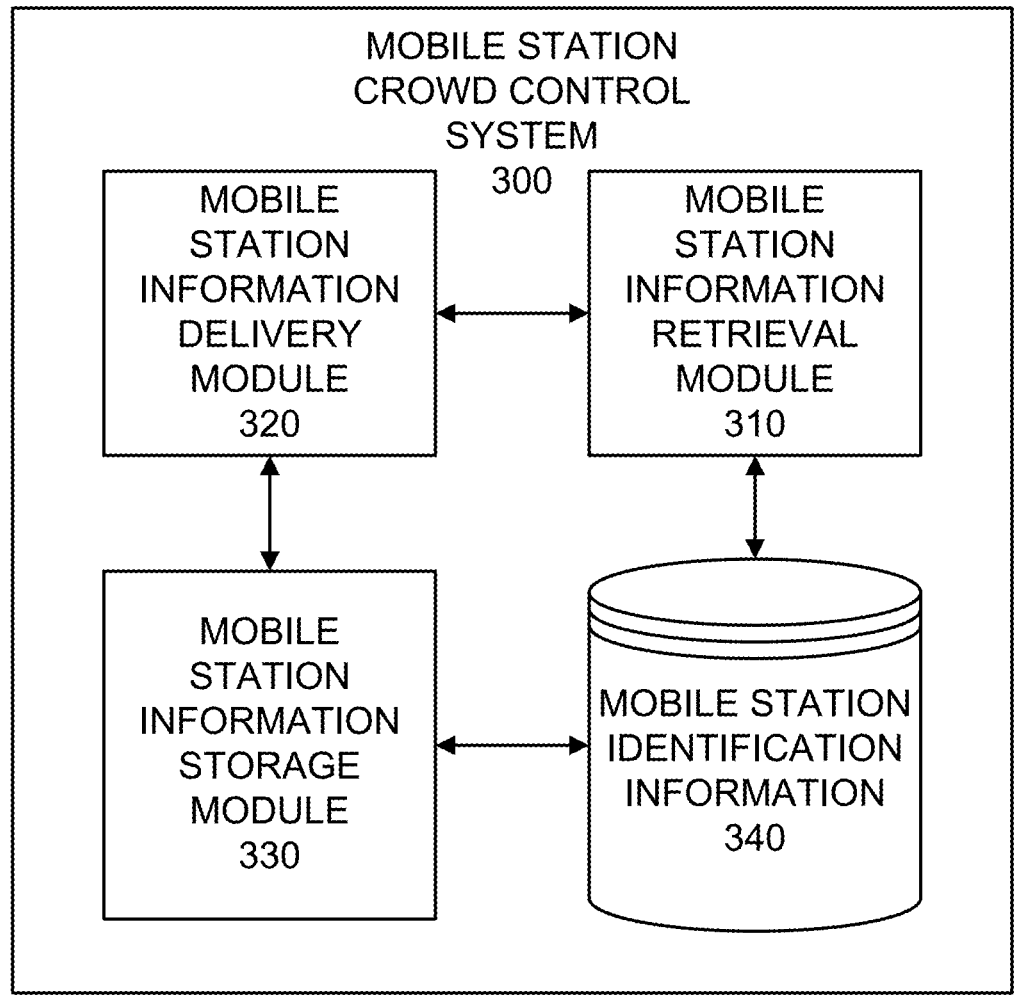
FIG. 3 illustrates an example crowd control communication system configuration according to example embodiments.

FIG. 3 illustrates a mobile station crowd control system 300 according to example embodiments. Referring to FIG. 3, one example method of operation may include providing content to multiple mobile station devices in a pre-defined venue location. Within the system 300, mobile station identification information may be pre-stored in a database 340 and used for identifying the mobile station devices as being present at the pre-defined venue location. An application may then be initiated that establishes a customized content delivery function utilized to deliver customized content to each of the identified plurality of mobile station devices based on mobile station information retrieved from the database 340 via the retrieval module 310. Once the application is enacted, a trigger command may be initiated to transmit the customized content to each of the mobile station devices at a predetermined time. The mobile station information delivery module 320 determines which devices at which locations receives which content as part of a larger plan to make each of the mobile stations part of a giant virtual monitor display. Next, the customized content may be transmitted to each of the mobile station devices responsive to receiving the trigger command via the mobile station information delivery module 320. The feedback received from the various mobile station devices may be stored in memory and used for subsequent data transfers via the mobile station information storage module 330.

Additional operations may include identifying the various mobile station devices as being present at the particular venue location by transmitting a request for specific location information to each of the plurality of mobile station devices and receiving and storing the specific location information in an application server database, such as the mobile station identification information database 340. The specific location information may include any or more of a seat assignment, global positioning system (GPS) coordinates, and triangulation power estimation signal information. The trigger command may include multiple trigger commands and the predetermined time may include a multiple different predetermined times, and each of the trigger commands specifies corresponding predetermined times to transmit the customized content to each of the plurality of mobile station devices. In general, the mobile stations each will receive different content at different times to produce a larger image requiring the cooperation of as many participants as possible. For example, the predetermined times may be different for each of the mobile station devices, and the customized content delivered to each of the mobile station devices is different for each of the mobile station devices. The predetermined venue location may be a stage hall, sports arena, concert hall, classroom, etc.

Figure 2D:
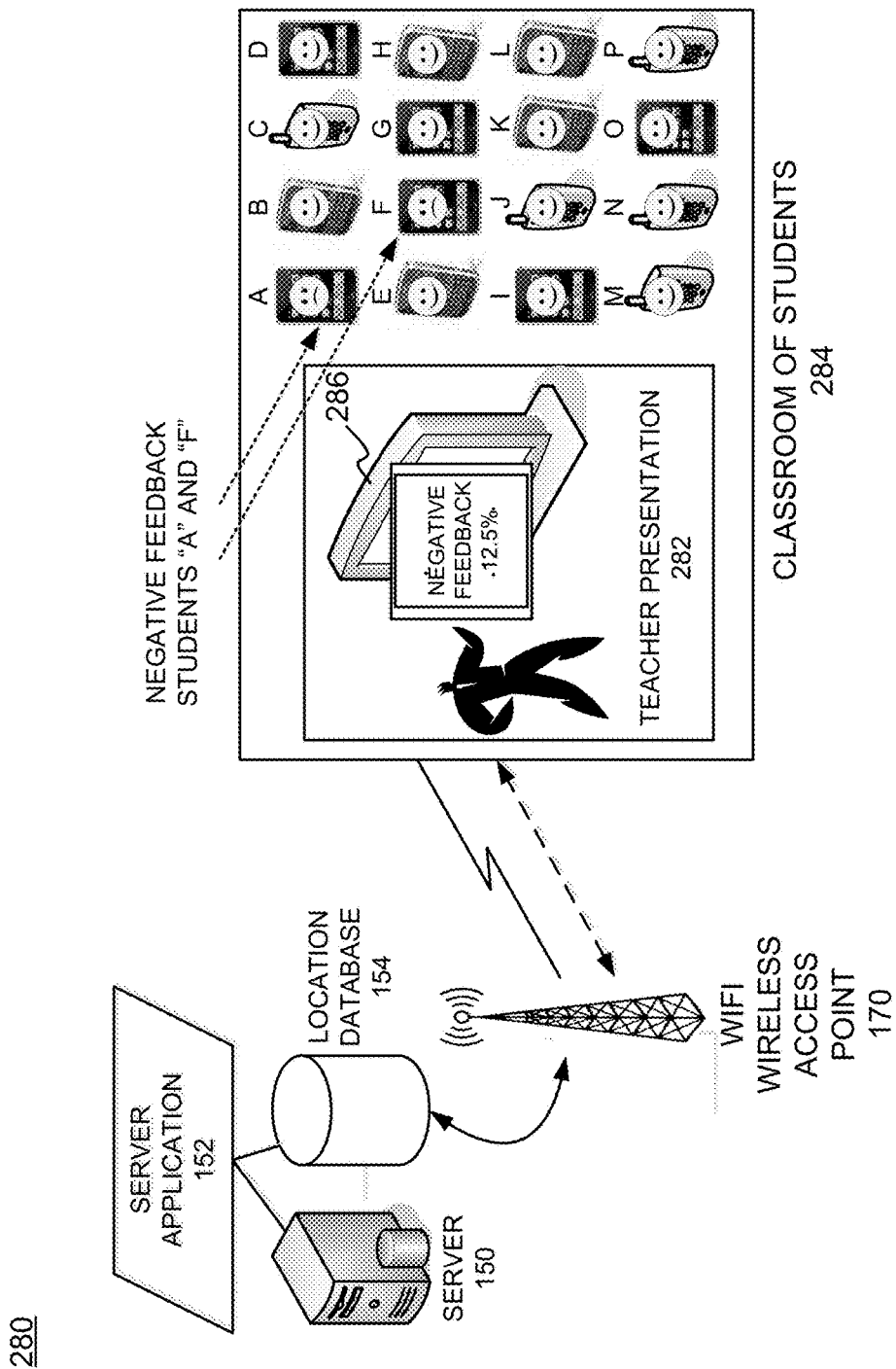
FIG. 2D illustrates another example of a classroom environment providing feedback to their instructor via interaction with their mobile stations.

FIG. 2D illustrates an example of a classroom environment according to example embodiments. Referring to FIG. 2D, a group of students A through P are identified via their mobile station devices. The students have downloaded and installed an application on their mobile stations that communicates with their instructor's application on his or her computer device 286. The teacher presentation 282 may be conducted in a classroom of students 284. The students may be enabled to enter questions, see examples and provide feedback via their mobile stations. Typically, a large classroom may be full of students who are apprehensive about asking questions or confirming they understand a particular concept that was recently introduced by the instructor.

As new subject matter is introduced to the students, the professor may initiate a feedback request via his or her computer device 286. As a result, the application may transmit the request to the WIFI wireless access point 170, which in turn communicates with the server 150 to retrieve a predefined menu interface that is then forwarded to a list of attending students who have logged into the application and are present in the classroom. The message may be sent to each of the mobile stations A-P indicating that feedback is required. The message may present to the users "Does everyone understand the macroeconomic curve for supply and demand that was just introduced?" As a result, the users may select a box, "YES" or "NO" and the answer would be submitted to the server 150 a compiled for a tally of results.

The results of the feedback would be presented to the instructor in any format to include user information, such as the student's name and response. In this example, students "A" and "F" have provided negative feedback by selecting a sad face logo in response to the question asked. Among 16 students, only 2 of the students have provided negative feedback as the rest of the students have selected a smiley face logo in response to the question asked by the instructor. The instructor's application has calculated based on the feedback that 2 of the dissatisfied students among the entire 16 students yields 12.5% negative feedback. The instructor may also view the students who have a problem as an added measure to decide whether to re-explain the subject matter of move forward and invite those with a problem to send an e-mail after class. Alternatively, the instructor may receive additional comments regarding the problems being experienced by students "A" and "F" and decide whether the questions are easy to answer or whether to instruct the students to follow-up after class.

Figure 2E:
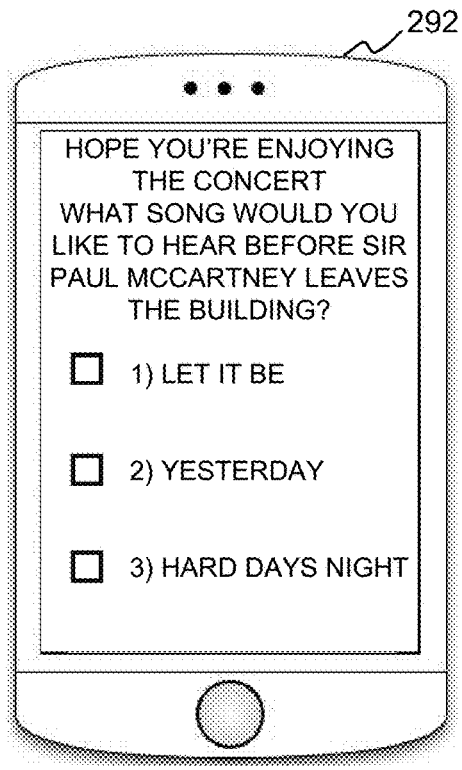
FIG. 2E illustrates an example mobile station user interface used to receive live feedback during a concert.
Figure 2E:
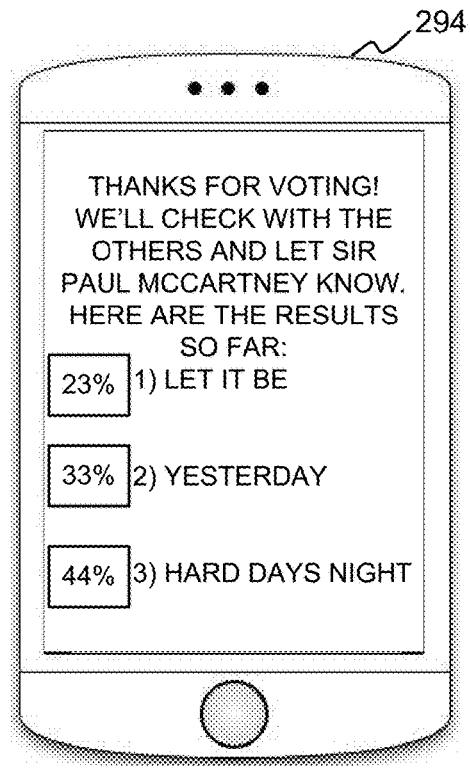

FIG. 2E illustrates another example of receiving feedback from a large number of users via their mobile stations. Referring to FIG. 2E, the user interface 290 for the audience question and feedback application may include a voting feature where a first menu option appears on the user's mobile station 292 to ask the user at a live concert whether the artist should close out a performance with a particular song (i.e., options 1, 2 or 3). As a result, the user may touch the screen and vote for his or her favorite song. The application may then acknowledge the user's input and provide a compilation of results 294 based on the feedback from all users present at the current venue.

The users may be further identified by their profile information registered at the server 150. For example, the server 150 and corresponding server application 152 may receive user specific input parameters, such as name, age, sex, occupation, address, income level, etc. The server parameters may be received during a setup procedure that the audience registers by answering questions on their mobile station application interfaces and sending the information to the application server 152 to be compiled.

The server 150 may weigh each of these parameters to modify a voting result. For instance, at a large venue, a particular performer or presenter may elect to have a certain demographic be recognized as the predominant customer of interest. As a result, the presenter or moderator may have his or her preferences inputted into the feedback application to offer the preferred audience demographic larger weighted results than the other participating members. For example, if a motivational speaker has reason to believe that his or her preferred demographic is persons aged 28-45 and having an income level between $75,000 and over, then the speaker may allow those persons feedback messages to be weighted 4 times more than the other members of the audience. As a result, the feedback messages received are computed and provided to the speaker in a manner that best suits their business interests.

In operation, the various users may be pre-registered or may register upon accessing the application to provide the corresponding user information via their mobile stations. The plurality of mobile station devices may be communicating with a server and server application which calculates the results and feedback messages and provides them to a moderator device in a pre-defined venue location. The operations may include identifying the mobile station devices as being present at the pre-defined venue location via a server and initiating an application on the server that establishes a feedback menu display and transmitting the feedback menu display to each of the identified mobile station devices. The server may then receive feedback messages from a majority of the plurality of mobile station devices responsive to the feedback menu display questions. The server may also process the feedback messages and provide a result to a moderator device.

The feedback messages may include at least one selected option from the feedback menu display that is provided to the user devices (i.e., vote, selection, etc.). The feedback messages may be received and processed by the server which computes a percentage the selected options received among a total number of the mobile station devices that received the feedback menu display and provided responses. A request for specific location information may be transmitted to each of the mobile station devices, and the results may be received and stored as specific location information in an application server database.

A most popular feedback decision from the majority of the plurality of mobile station devices (i.e., "song two", "yes" or "no", "I want more", "I don't understand", etc.) may be identified and calculated based on the total definite feedback decisions divided by the total number of users or mobile stations that received the feedback menu options (i.e., questions requiring an answer). The server may then transmit a result to the moderator device indicating the most popular feedback decision so the moderator can know what the audience members are experiencing, desiring or feeling.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent any of the above-described network components of the other figures.

Figure 4:
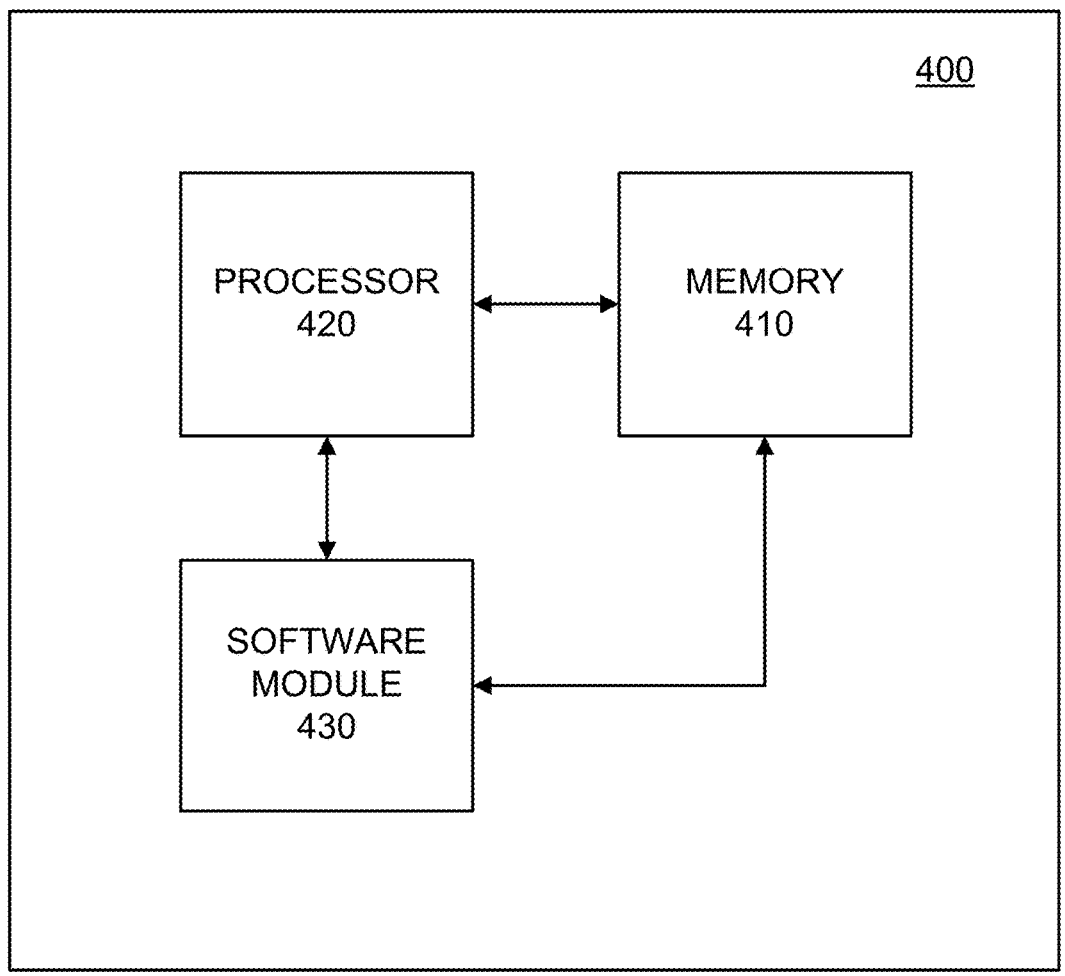
FIG. 4 illustrates a network entity that may include memory, software code and other computer processing hardware used to perform various operations according to example embodiments.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5A:
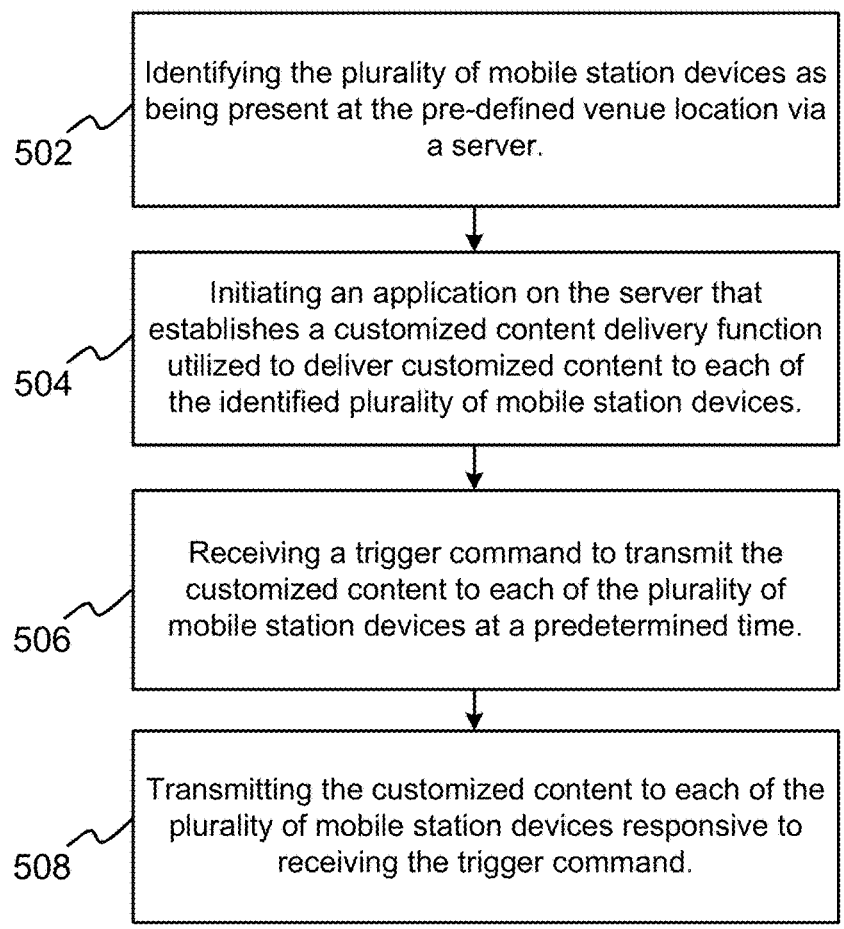
FIG. 5A illustrates a flow diagram of an example method of operation.

One example method of operation is illustrated in the flow diagram of FIG. 5A. Referring to FIG. 5A, the method 500 provides content to a plurality of mobile station devices in a pre-defined venue location. The method may include identifying the plurality of mobile station devices as being present at the pre-defined venue location via a server, at operation 502. The method may also include initiating an application on the server that establishes a customized content delivery function utilized to deliver customized content to each of the identified plurality of mobile station devices, at operation 504. The method may also include receiving a trigger command to transmit the customized content to each of the plurality of mobile station devices at a predetermined time, at operation 506 and transmitting the customized content to each of the plurality of mobile station devices responsive to receiving the trigger command at operation 508.

Figure 5B:
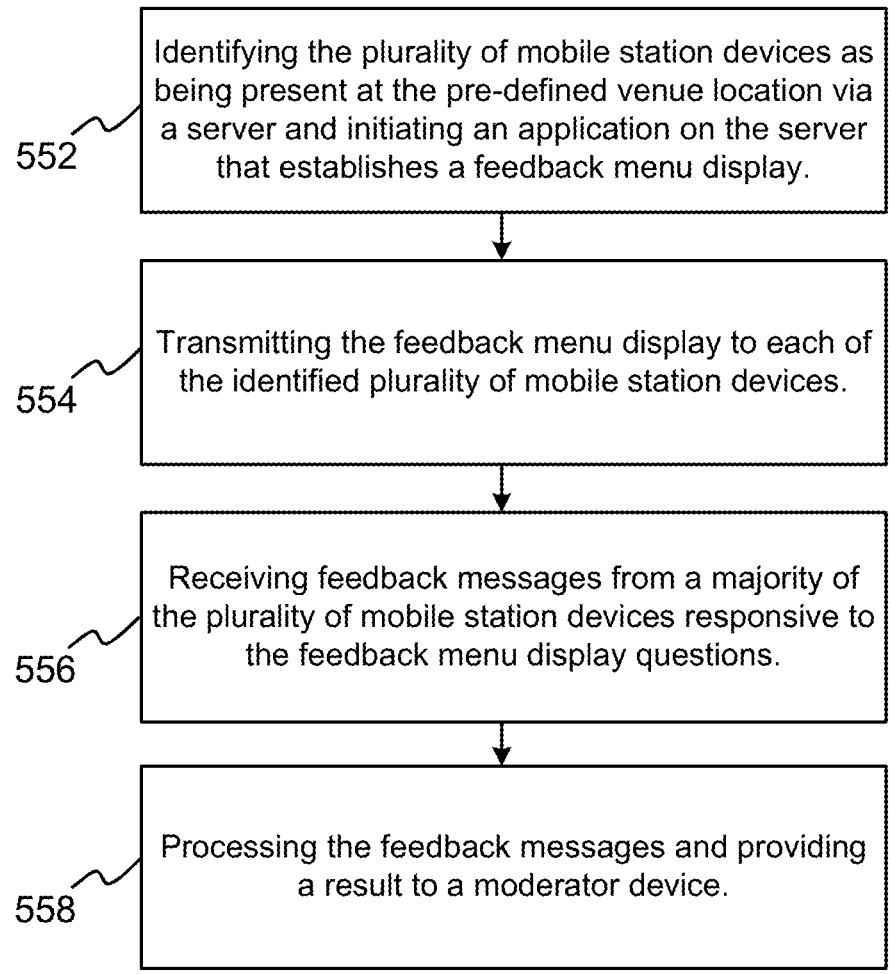
FIG. 5B illustrates a flow diagram of another example method of operation.

Another example method of operation is illustrated in the flow diagram of FIG. 5B. Referring to FIG. 5B, the method 550 provides communicating between the plurality of mobile station devices and a moderator device in a pre-defined venue location. The method may include identifying the plurality of mobile station devices as being present at the pre-defined venue location via a server and initiating an application on the server that establishes a feedback menu display, at operation 552, transmitting the feedback menu display to each of the identified plurality of mobile station devices, at operation 554 and receiving feedback messages from a majority of the plurality of mobile station devices responsive to the feedback menu display questions, at operation 554. The method may also include processing the feedback messages and providing a result to a moderator device.

Although an exemplary embodiment of the system, method, and non-transitory computer readable medium of the present application has been illustrated in the accompanied drawings and described in the foregoing detailed description, it will be understood that the present invention is not limited to the embodiments disclosed, but is capable of numerous rearrangements, modifications, and substitutions without departing from the spirit or scope of the invention as set forth and defined by the following claims. For example, the capabilities of the systems illustrated in FIGS. 1-3 may be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
initiating an application on a server that establishes a customized content delivery function utilized to deliver customized content to each of an identified plurality of mobile station devices present at a pre-defined venue location; and
transmitting the customized content to each of the plurality of mobile station devices responsive to receiving a trigger command at a predetermined time;
wherein the customized content is transmitted such that each screen of the plurality of mobile station devices is treated as a single pixel of light in a larger image resembling a digital monitor;
wherein the plurality of mobile stations are identified by transmitting a request for specific location information to each of the plurality of mobile station devices;
wherein the specific location information comprises at least one of a seat assignment, global positioning system (GPS) coordinates, and triangulation power estimation signal information.

2. The method of claim 1, comprising receiving and storing the specific location information in an application server database.

3. The method of claim 1, wherein the trigger command comprises a plurality of trigger commands and the predetermined time comprises a plurality of different predetermined times, and wherein each of the plurality of trigger commands specifies a corresponding plurality of predetermined times to transmit the customized content to each of the plurality of mobile station devices.

4. The method of claim 3, wherein the plurality of predetermined times are different for each of the plurality of mobile station devices.

5. The method of claim 3, wherein the customized content delivered to each of the plurality of mobile station devices is different for each of the plurality of mobile station devices.

6. The method of claim 1, wherein the predetermined venue location comprises at least one of a stage hall, a sports arena, a concert hall, and a classroom.

7. The method of claim 1, wherein the customized content is transmitted such that each of the plurality of mobile station devices collectively form a plurality of images over time that act as a video.

8. The method of claim 1, wherein the transmitting further comprises determining what color should be displayed by each of the plurality of mobile station devices at a given time.

9. The method of claim 1, wherein image is mapped onto the plurality of mobile station devices according to their respective locations via a mapping table that includes at least one of a mobile station identifier, a mobile station location, an image color at a particular pixel, an image intensity, and an image duration.

10. An apparatus, comprising:
a processor configured to initiate an application on a server that establishes a customized content delivery function utilized to deliver customized content to each of an identified plurality of mobile station devices; and
a transmitter configured to transmit the customized content to each of the plurality of mobile station devices responsive to a receipt of a trigger command at a predetermined time;
wherein the customized content is transmitted such that each screen of the plurality of mobile station devices is treated as a single pixel of light in a larger image resembling a digital monitor;
wherein the plurality of mobile stations are identified by a request for specific location information transmitted to each of the plurality of mobile station devices;
wherein the specific location information comprises at least one of a seat assignment, global positioning system (GPS) coordinates, and triangulation power estimation signal information.

11. The apparatus of claim 10, wherein a receiver is configured to receive and store the specific location information in an application server database.

12. The apparatus of claim 10, wherein the trigger command comprises a plurality of trigger commands and the predetermined time comprises a plurality of different predetermined times, and wherein each of the plurality of trigger commands specifies a corresponding plurality of predetermined times to transmit the customized content to each of the plurality of mobile station devices.

13. The apparatus of claim 12, wherein the plurality of predetermined times are different for each of the plurality of mobile station devices.

14. The apparatus of claim 12, wherein the customized content delivered to each of the plurality of mobile station devices is different for each of the plurality of mobile station devices.

15. The apparatus of claim 10, wherein the predetermined venue location comprises at least one of a stage hall, a sports arena, a concert hall, and a classroom.

16. A non-transitory computer readable storage medium configured to store instructions that, when executed, cause a processor to:
initiate an application on a server that establishes a customized content delivery function utilized to deliver customized content to each identified plurality of mobile station devices; and
transmit the customized content to each of the plurality of mobile station devices responsive to receiving a trigger command at a predetermined time;
wherein the customized content is transmitted such that each screen of the plurality of mobile station devices is treated as a single pixel of light in a larger image resembling a digital monitor;
wherein the plurality of mobile stations are identified by transmitting a request for specific location information to each of the plurality of mobile station devices;
wherein the specific location information comprises at least one of a seat assignment, global positioning system (GPS) coordinates, and triangulation power estimation signal information.

17. The non-transitory computer readable storage medium of claim 16, wherein the processor is configured to storing receive and store the specific location information in an application server database.

18. The non-transitory computer readable storage medium of claim 16, wherein the trigger command comprises a plurality of trigger commands and the predetermined time comprises a plurality of different predetermined times, and wherein each of the plurality of trigger commands specifies a corresponding plurality of predetermined times to transmit the customized content to each of the plurality of mobile station devices.

19. The non-transitory computer readable storage medium of claim 18, wherein the plurality of predetermined times are different for each of the plurality of mobile station devices.

20. The non-transitory computer readable storage medium of claim 18, wherein the customized content delivered to each of the plurality of mobile station devices is different for each of the plurality of mobile station devices.

\* \* \* \* \*